United States Patent [19]

Donohoe

[11] Patent Number: 4,763,557

[45] Date of Patent: Aug. 16, 1988

[54] ONE-PIECE HOLLOW DRUMSTICK AND METHOD OF MAKING

[76] Inventor: David G. Donohoe, Rte. 2, Box 276, Springville, Calif. 93265

[21] Appl. No.: 2,125

[22] Filed: Jan. 12, 1987

[51] Int. Cl.$^4$ .......................................... G10D 13/00
[52] U.S. Cl. .................................................. 84/422 S
[58] Field of Search ...................................... 84/422 S

[56] References Cited

U.S. PATENT DOCUMENTS

| | | | |
|---|---|---|---|
| 3,147,660 | 9/1964 | Brilhart | 84/422 S |
| 4,202,241 | 5/1980 | Lucas | 84/422 S |
| 4,320,688 | 3/1982 | Donohoe | 84/422 S |

*Primary Examiner*—L. T. Hix
*Assistant Examiner*—Brian W. Brown
*Attorney, Agent, or Firm*—William L. Chapin

[57] ABSTRACT

A one-piece injection molded drumstick and method of making the drumstick are presented. The drumstick has a conventional appearing exterior surface, i.e., a relatively long cylindrical rear handle section of relatively uniform external diameter, a relatively short shank section which tapers uniformly from the forward end of the handle section to a smaller diameter neck section, and a substantially short, enlarged bulbous tip section joined to the neck portion. Formed within the handle and shank portion of the drumstick is an axially symmetric tunnel having substantially the same taper as the exterior of the drumstick, thereby resulting in a hollow handle and shank portion of substantially uniform wall thickness. The tunnel tapers down to a generally cylindrical hollow section which passes out through the front end of the tip section. Uniform wall thickness is made possible by the use of a bushing surrounding and supporting the molding core and sliding longitudinally within the mold cavity in response to molten plastic injected into the mold, maintaining the exterior surface and tunnel precisely concentric.

6 Claims, 1 Drawing Sheet

U.S. Patent
Aug. 16, 1988
4,763,557
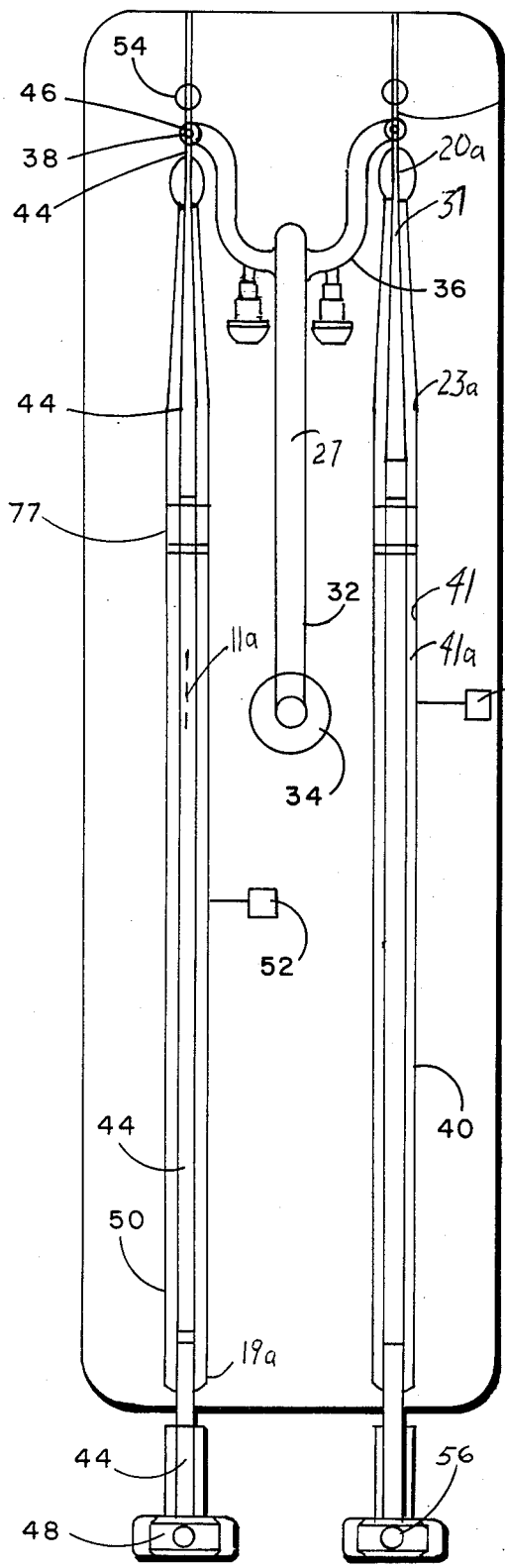
FIG. 6
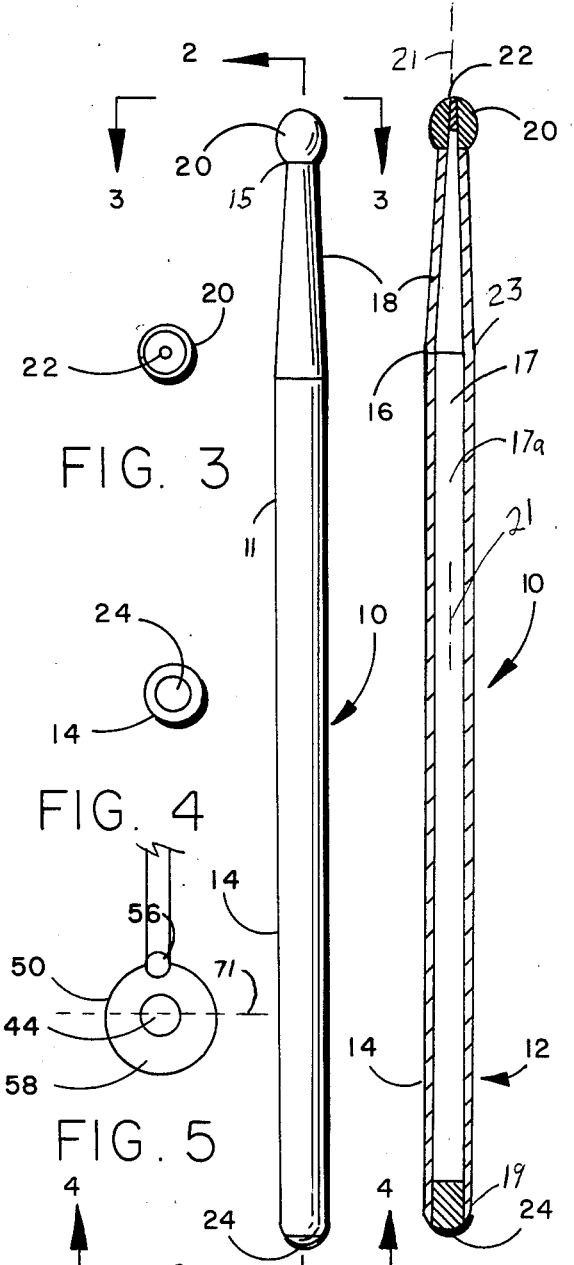
FIG. 3
FIG. 4
FIG. 5
FIG. 1
FIG. 2
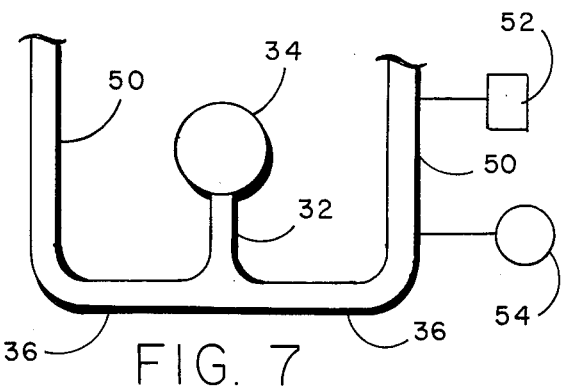
FIG. 7

ONE-PIECE HOLLOW DRUMSTICK AND METHOD OF MAKING

BACKGROUND OF THE INVENTION

1. Field of the Invention

The present invention relates to one piece drumsticks having an axial tunnel from end to end and methods of making such drumsticks.

2. Description of the Prior Art

Drumsticks go back to pre-history. There have probably been more changes in drumsticks in the past ten years than in the previous 10,000 years. The amount of energy transmitted by the drumstick to the drum is one of the major factors determining the sound. Energy is a function of the square of the velocity times the mass of the drumstick. Normally it is the tip only which strikes the drum or other musical instrument such as cymbals.

To appreciate the energy required by the drummer, one really has to see a good drummer in action. He strikes the drum with tremendous velocity and very little time elapses between impacts on the drum. He may play for hours. For these reasons, primarily, playing the drum is not only playing a musical instrument, but also an athletic event. A good drummer has to be a good athlete at least in relation to his drumming. There has been a tendancy toward lighter drumsticks. Because of the light weight of modern drumsticks and the tremendous velocities at impact, Drumsticks break relatively frequently. A set of drumsticks of typical prior art design lasts about one night.

It is well known that a hollow cylinder is stronger than a solid cylinder of the same sectional mass and other characteristics. This is why bridges are built with girders comprising thin perpendicular members such as a T or H cross-section instead of solid members. Apparently making material into a hollow cylinder shape permits the material to resist breaking or bending because there is a leverage advantage in having part of the material disposed farther from the material axis or other parts of material.

In addition, a drumstick which is totally hollow along its entire length vibrates differently than any other type of drumstick so that the sound generated when the drumstick hits the drum is slightly different. In a day when there are thousands of musicians not earning big money for everyone who is, a slightly different sound has been associated with many successful musicians and bands and anything which gives a band an ability to sound different can be a critical advantage in the subjective world of band sounds.

Part of the reason why hollow drumsticks, in spite of their other advantages, have not caught on is because, on information and belief, no one has previously made a hollow one piece drumstick. It has always been possible theoretically to make a hollow one piece drumstick. For example, you could make a solid drumstick, then drill a hole through it. Unfortunately, all prior art hollow drumsticks were economically impossible to make. Because of the advantages of hollow drumsticks, the prior art does disclose drumsticks which are hollow almost all the way through or drumsticks which are not one piece but are hollow all the way through. An example of the latter is Lucas, No. 4,202,241. Applicant's prior drumstick, Donohoe, No. 4,320,688, filed 12/8/80 and issued 3/23/82 has many of the advantages of the present invention, but is not quite ideal.

What is needed is a hollow one piece drumstick fabricated from a very strong material so that it will last about ten times as long as prior art drumsticks. The one piece construction reduces cost, increases strength, gives a slightly different sound characteristic, and possesses other advantages as set forth previously. Drumsticks manufactured according to the method set forth in the present application lasts about ten times as long as the most durable prior art drumsticks of similar weight and balance. Because drumsticks hit the drum thousands of times before breaking and are normally totally undamaged until one hit causes damage, even a slight increase in ability to resist damage from that one hit can and does increase the life of the drumstick by a factor of ten or more.

SUMMARY OF THE INVENTION

A one piece drumstick is presented. The drumstick comprises a tip having essentially the same outside shape as prior art drumstick tips but having an interior surface defining an axially symmetric tunnel. The drumstick, of course, is axially symmetric.

The drumstick further includes a wall formed in one piece with the tip at substantially the same time the tip is formed. The only difference in time being the fact that the plastic material from which the drumstick is made enters a mold at one end and is then pushed to the other end so that there are probably very slight difference in the time of formation of the two ends, the differences in time of formation being negligible. The wall also has essentially the same outside shape as prior art drumsticks, but has an interior surface defining a tunnel symmetrical about the axis around which the tip and wall are symmetricaly disposed. The wall has a shank portion tapering to a narrower diameter at the shank-/tip common external surface which is called the neck of the drumstick. The aft portion of the wall comprises a handle of substantially uniform exterior diameter. The tunnel within the tip and shank has a slightly lesser diameter at the fore end of the drumstick, such that the thickness of the wall from the neck of the drumstick to the butt end is substantially identical. In some examples, there is approximately a difference of 0.005 inches from the aft end of the shank to the butt end to permit easy core removal after molding.

It is believed that a drumstick fabricated according to the present invention should be claimed in the same application as the method of making the drumstick, so the present application includes both drumstick and method.

The method of molding a drumstick according to the present invention or any one-piece-hollow-from-end-to-end plastic drumstick, each disposal symmetrically around an axis and comprising a cylindrical wall of substantially uniform thickness aft of the tip of the drumstick, comprises the following steps.

Liquid plastic capable of being injection molded is caused to flow from a reservoir via at least one coupling runner through a gate into a drumstick mold having an interior surface defining a cavity of the same shape as the exterior surface of the drumstick to be molded. The mold interior surface is axially symmetric. The drumstick mold is disposed around a removeable tunnel-forming core. The tunnel forming core is axially symmetric about the axis of the drumstick mold. The fore end of the core is cylindrical forward of approximately the center of the tip of the mold then tapers outward at the angle of taper desired for the drumstick to be formed, a distance equal to the distance from the fore tip that the drumstick is to taper. The core then is of substantially uniform diameter to form a substantially uniform interior diameter of the handle of the drumstick. The liquid plastic, as the plastic fills the mold, pushes a plunger bushing sliding around the core inside the mold and having the approximately the internal diameter of the core aft external diameter and the plunger bushing having the external diameter of the mold for internal diameter from fore end of handle to butt end, thereby stabilizing the core during filling. The plunger bushing holds the core in a stable position until the plastic surrounds the core after which the plastic holds the core in a stable condition, thereby causing the drumstick which is formed to have a uniform thickness which is desireable for purposes of strength and uniformity of sound generated by the drumstick. The liquid plastic is then cooled by prior art means to form a drumstick. The drumstick is ejected by opening the mold which in most examples known to the prior art divides in half and pushing out the drumstick by means of ejector pins coupled to push against the drumstick. The core is removed from the drumstick by pulling the core in the aft direction in relation to the drumstick. In some examples, in order to make the core easier to remove, the thickness of the wall from the fore end of the handle to the butt end differs by about 0.005 inches to permit easy core removal after molding. Other examples include a tip plug inserted into the tip and a butt plug inserted into the butt end of the drumstick and a light weight foam which fills the drumstick tunnel.

DRAWING DESCRIPTION

Reference should be made at this time to the following detailed description which should be read in conjunction with the following drawings, of which:

FIG. 1 is a side view of a drumstick fabricated according to the present invention;

FIG. 2 is a partially cut away side view of a drumstick of FIG. 1;

FIG. 3 is a front view of a drumstick according to the present invention;

FIG. 4 is an aft view of a drumstick according to the present invention;

FIG. 5 illustrates the resetting of a part of a mold as the halves of the mold have come together and the ejector pin is being removed;

FIG. 6 is a side view of a drumstick according to the present invention being injection molded; and FIG. 7 is another view of a part of the injection molding of a drumstick according to the present invention.

DETAILED DESCRIPTION

Reference should be made at this time to FIGS. 1–7 which show various examples of a drumstick 10 according to the present invention and the mechanism 30 by which a drumstick 10 according to the present invention may be injection molded. FIGS. 1 and 2 illustrate side and side cut away view of a one piece drumstick 10 having an external surface 11 substantially identical to prior art drumsticks (not shown) but having an interior surface 16 defining an axial tunnel 17.

A tip 20 has essentially the same outside shape as prior art drumstick tips (not shown) but has an interior surface defining an axial tunnel 17 symmetrical about an axis 21 around which the tip 20 is symmetrically disposed.

A wall 14 is formed in one piece with the tip 20 at substantially the same time the tip 20 is formed. The wall 14 has essentially the same outside shape defined by surface 11 as prior art drumsticks, but has an interior surface 16 defining a tunnel 17 symmetrical about the axis 21 about which the tip 20 and wall 14 are symetrically disposed. The tunnel 17 extends the entire length of the drumstick 10 although FIGURES 1 and 2 illustrate a possible example of the invention having plugs 22, 24 in the fore and aft ends of the drumstick 10. The wall 14 has a shank fore portion 18 tapering to a narrow diameter at the shank/tip common external surface 15 which is called the neck 15. The aft portion of the wall 14 comprises a handle 12 of substantially uniform exterior diameter, the tunnel 17 within the shank 18 and tip 20 tapering to a lesser diameter as the fore part of the drumstick 10 is approached, such that the thickness of the wall 14 from the neck 15 to the butt end 19 is substantially identical except for approximately a difference of 0.005 inches (5/thousands) in a preferred example from the aft end 23 of the handle 12 to the butt end 19 to permit easy core removal after molding.

FIGS. 6 and 7 illustrate the method of molding a onepiece, hollow-from-end-to-end plastic drumstick 10 disposed symmetrically around an axis 21 and comprising a cylindrical wall 14 of substantially uniform thickness aft of the tip 20 of the drumstick 10. Injection molding is utilized as perhaps best shown in FIG. 6 which illustrates a molding arrangement 30. The method comprises causing liquid plastic 27 capable of being injection molded to flow from the reservoir 34 via at least one coupling runner 32 through a gate 36 into a drumstick mold 40 having an interior surface 41 defining a cavity 41a of the same shape as the exterior surface 11 of the drumstick 10 to be molded. The mold interior surface 41 is axially symmetric. The drumstick mold 40 is disposed around a removeable tunnel forming core 44. The tunnel forming core is axially symmetric about the axis 11a of the drumstick mold 40. The fore end 31 of the core 44 is cylindrical forward of approximately the center of the tip 20a of the mold 40. The core, then tapers outward at the angle of taper desired for the drumstick 10 to be formed along core taper 37. The tapered distance in distance equal to the distance between the fore tip 20a and the uniform diameter handle portion 12. The core 44 is then of substantially uniform diameter from end of taper 23a to aft end 19a. The differences in diameter between mold 40 and core 44 are substantially identical aft of the tip 20a.

After the mold 40 as described previously herein is filled with plastic, the plastic is injection molded by means known to to the prior art to mold a drumstick 10. The drumstick 10 is then ejected by opening the mold which divides in half along a line 71 (see FIG. 5) by means of ejection pins 54, 56 coupled to push against the drumstick. The core 44 is then removed from the drumstick 10 by pulling the core 44 in the aft direction in relation to the drumstick 10. The drumstick may then be finished by means known to the prior art. If desired, a tip 22 and/or butt 24 plug may be inserted into the drumstick as shown in FIG. 2 and the aft end 19 of the drumstick 10 may be rounded as shown in FIGS. 1 and 2. FIG. 6 illustrates a rectangular aft end angle which may also be desired for certain applications and is a second example of the drumstick 10.

Quality of drumsticks 10 produced by this method is maintained by use of a plunger bushing 77 shown in FIG. 6. The plunger bushing 77 slides longitudinally within cavity 41 of the mold 40 during filling. The liquid plastic 32 pushes the plunger bushing 77 as the plastic 32 fills the mold 40. The plunger bushing 77 has the internal diameter of the core 44 aft external diameter about which it is disposed and the external diameter of the mold 40 for internal diameter within which it slides from fore end of handle 12 to butt end 19, thereby stabilizing the core 44 during filling which results in a more uniform drumstick 10, not having minor changes in wall thickness which the drumstick 10 would otherwise have which would cause drumstick weakness and undesireable changes in characteristics.

FIG. 6 shows mold 30 upside down compared to the way molding is actually done. Plastic 32 enters near tip 20a at the bottom and flows upward toward head 48 from which mold 30 hangs. In actual operation, a hydraulic core puller well known to the prior art and not shown, is used to pull cores 44 from drumsticks 10. In FIG. 6, two drumsticks 10 are shown being molded at the same time. Obviously, some other number other than two could be molded at the same time and all that would be required would be a different number of elements than shown in FIG. 6.

FIG. 5 illustrates a core 44 having been set back into a mold cavity 50 which has been put back together along dividing line 71 to form a space 58 into which plastic 27 is to flow. An ejector pin 56 is about to be removed after having ejected the previous drumstick 10.

Drumsticks 10 may be made with tunnel 17 of uniform diameter inside handle 12 so that handle 12 has walls of uniform diameter. but in the preferred example, there is a slight difference to permit easy core 44 removal after molding. The use of the plunger bushing 77 permits extremely precise control of the thickness of the wall of the handle 12 by maintaining core 44 in a precise orientation until core 44 is surrounded by plastic 27 which then stabilizes core 44.

A particular example of the invention plus the same example having a slightly different thickness handle 12, and tip plug 22, butt plug 24 and light weight foam 17a filling drumstick tunnel 17 has been described. Other examples will be obvious to those skilled in the art. The invention is limited only by the following claims.

I claim:
1. A one-piece drumstick consisting of:
    (a) relatively long cylindrical handle section of relatively uniform external diameter,
    (b) an integrally formed, relatively short shank section which tapers uniformly from the forward end of said handle section to a smaller diameter neck section,
    (c) an integrally formed substantially shorter enlarged tip section joined to the forward end of said shank section and,
    (d) an integrally formed central coaxial tunnel extending the entire length of said drumstick, that portion of said tunnel underlying said handle portion and said shank portion of said drumstick having a substantially uniformly smaller diameter than the overlying exterior surface of said drumstick, thereby resulting in a substantially uniform wall thickness of said handle and shank portions , said tunnel having a diameter which decreases monotonically from the rear portion of said drumstick to the front portion thereof.
2. The drumstick of claim 1 wherein that portion of said tunnel passing through said tip section is no larger in diameter than that portion of said tunnel underlying the junction between said tip section and said shank section.
3. The drumstick of claim 2 wherein that portion of said tunnel passing through said handle section tapers to somewhat smaller diameter from the rear end of said handle section to the forward end of said handle section.
4. The drumstick of claim 3 further including a light weight foam filling said tunnel.
5. The drumstick of claim 3 further including a tip plug extending into said tunnel from the forward end of said tip.
6. The drumstick of claim 3 further including a butt plug extending into said tunnel from the rear end of said handle section.

* * * * *